Oct. 9, 1956  P. F. RAHR  2,765,729
KNOCK-DOWN CAKE PAN
Filed Jan. 9, 1956
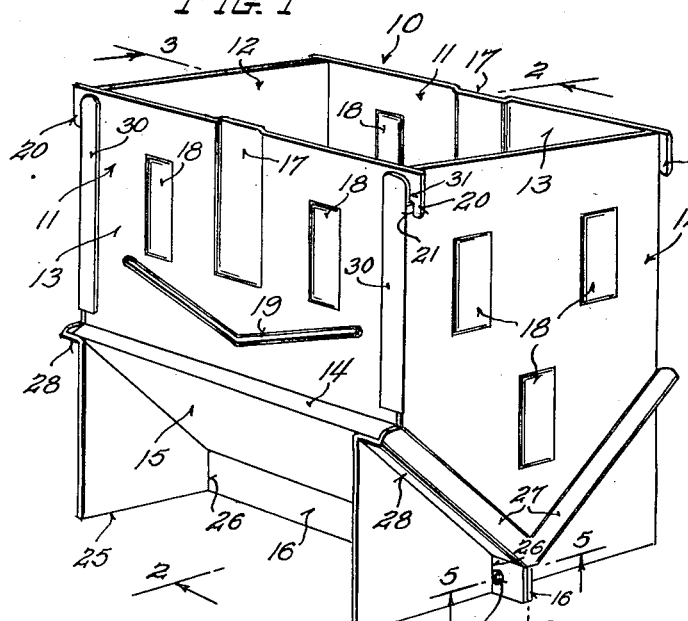
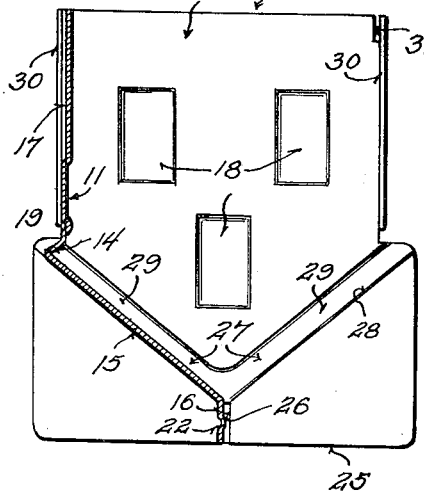
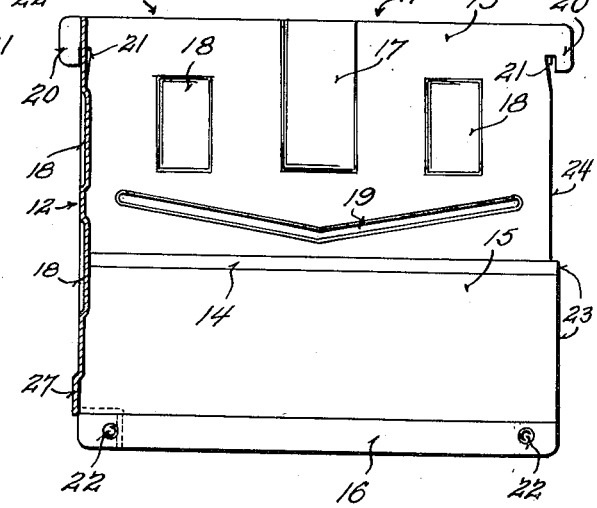
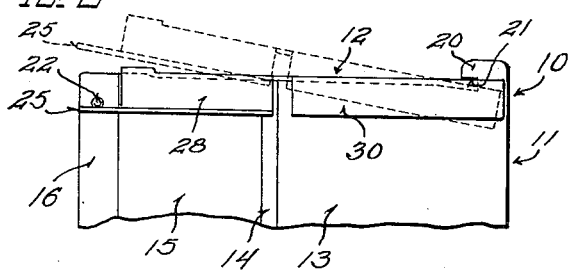
INVENTOR.
Paul F. Rahr
BY
Attorney

United States Patent Office 2,765,729
Patented Oct. 9, 1956

2,765,729
KNOCK-DOWN CAKE PAN

Paul F. Rahr, Manitowoc, Wis., assignor to Aluminum Specialty Company, Manitowoc, Wis., a corporation of Wisconsin Application January 9, 1956, Serial No. 557,884

8 Claims. (Cl. 99—436)

This invention relates to knock-down pans and more particularly to a pan in which an object in miniature such as a house, may be formed.

In the past, many forms of cake or gingerbread houses have been baked and decorated for special occasions. The vast majority of these houses have been baked with their sides, ends and roof portions formed of separate flatly rolled and baked pieces of gingerbread or cooky dough which have been joined by means of syrup or frosting to present an object having the general appearance of a house. Windows, doors and other features of the house have been applied to the flat slab portions of the house by the use of suitably colored frostings or candies. This form of house has required that the individual pieces be correctly formed and cut before baking and frequently warpage or shrinkage has made it difficult to complete the project in a satisfactory manner. The time-consuming and tedious effort required to fashion the house in accordance with the time-honored custom has resulted in the virtual disappearance of this interesting and delectable object which is so fascinating to both children and adults.

The primary object of the present invention resides in the provision of a simple, inexpensive and effective knock-down pan in which a solid object in miniature such as a house may be formed.

A further object of the present invention resides in the provision of a new and improved knock-down pan which embodies the structural features of a common object in miniature in a manner which results in the natural appearance of the miniature object.

Another object of the present invention resides in the provision of a new and improved knock-down pan simulating the appearance of a house and having its side and end portion members provided with indentations which delineate doors and windows to facilitate the decoration of the finished house.

Another object of the present invention is to provide a new and improved pan of the knock-down type to afford compact and easy storage.

Another object of the present invention resides in the structural form of its several parts which may be quickly and easily assembled into interlocking relationship to provide a pan which is both rigid and durable.

Another object of the invention is to provide a knock-down pan which facilitates its easy washing and cleaning.

Another object of the invention is to provide a knock-down pan which is readily removable from the finished cake without encountering the danger of damage to the cake in the process.

A more specific object of the present invention resides in the provision of supporting means formed integrally with parts of the pan adapted to support the same in upright position wherein the object in miniature is formed in inverted position.

Other objects and advantages of the present invention will become apparent from the following description of an illustrative embodiment of the invention.

In the drawings:

Figure 1 is a perspective view of the knock-down pan in assembled condition;

Fig. 2 is a vertical transverse sectional view taken on the line 2—2 of Fig. 1 showing one of the two identical end members in elevation and one of the combined side and bottom members in section with the other, one removed to illustrate certain details of construction;

Fig. 3 is a vertical longitudinal sectional view taken on the line 3—3 of Fig. 1 showing one of the two identical side and bottom members in elevation and one of the end members in section with the other one removed to illustrate certain structural details;

Fig. 4 is an enlarged fragmentary perspective view of the upper corner of adjacent side and end members about to be joined in interlocking engagement through the medium of cooperating slotted portions in each of the members;

Fig. 5 is an enlarged horizontal fragmentary sectional view taken on the line 5—5 of Fig. 1 and showing the cooperating relationship between the depending flange portions formed on the side and bottom members each of the depending flange portions including dimples which cooperate to serve the dual purposes of precluding relative longitudinal movement between the members and as a means for releasably retaining the end member in latched association with the side members; and Fig. 6 is a fragmentary side elevational view showing the method by which the end members are applied and releasably retained in interlocking relationship with the side members; the initial position of the end member being shown in dotted lines and the latched position of the end member being shown in full lines.

Referring more particularly to Fig. 1 of the accompanying drawing, it will be noted that the assembled pan 10 chosen for illustrative purposes is in the form of an inverted miniature house and comprises a pair of identically formed side members 11 and a pair of identically formed end members 12. Each of the side members include a vertically disposed wall portion 13, an outwardly directed eave portion 14, an inwardly and downwardly directed roof portion 15, and a downwardly directed vertically disposed ridge portion 16. The wall portion 13 of each of the side members 11 include depressions 17 and 18 respectively simulating the appearance of a door and windows. Each of the wall portions 13 may be additionally adorned by a slightly elevated rib 19 extending across the house and simulating the presence of a porch roof. The upper outer marginal edge of each of the wall portions 13 of the side members 11 is provided with ears 20 which extend beyond the marginal edges 24 of the members 11. Each of the ears 20 include an upwardly directed slot 21 having a greater width at its base than at its mouth to facilitate the application and removal of the end members 12 to and from the side members 11. A pair of reversely disposed dimples 22 are positioned adjacent the opposite ends of the ridge portion 16 of the member 11. The reversely disposed dimples 22 are adapted to nest to preclude relative movement between the side members 11 when the inner surfaces of the ridge portions 16 of the side members 11 are placed in face to face contact with the wall portions 13 disposed in lateral spaced relationship. It should be noted at this point that lateral edges 23 of the eaves 14, roof 15, and ridge portion 16 extend outwardly beyond lateral edges 24 of the side members 11 so as to overlie or extend beyond the vertical plane formed by the lateral edges 23 of the side members 11.

The identically formed vertically disposed end members 12 are provided with window-simulating depressions 18 and each of the members 12 includes a lower horizontally disposed marginal edge 25 which cooperates with the lower marginal edge of the ridge portion 16 of the roof 15 to provide a support for the assembled pan 10. The lower marginal edge 25 of each of the end members 12 is provided with a centrally disposed upwardly directed slot 26 having a width sufficient to be slidably received over the ends of the flanges 16 of the side members 11 when they lie in face-to-face abutting relationship. A pair of upwardly and outwardly extending grooves 27 having their apex at the base of the slot 26, serve to form a flange 28 which serves to underlie and support the side marginal portions of the roof 15 and is provided with sufficient depth to position the slot 26 in cooperating relationship with the dimples 22 to form a means for releasably retaining the positioned end members 12 in latched cooperating association with the side members 11 (see Fig. 5). The grooves 27 are each provided with an inner base surface 29 adapted to lie in surface contact with the lateral edges 23 of the roof 15 and eave portions 14 of the side members 11. A pair of vertically disposed flanges 30 are turned from the sides of the member 12 and are adapted to overlie the lateral marginal portions of the side members 11 over the major height of the wall portions 13. A vertically disposed slot 31 located at the junction between the end member 12 and each of the flanges 30 extend downwardly from the top marginal edge of the end members 12.

The slots 31 formed in the end members 12 cooperate with and are slidably receivable in the slots 21 formed in the ears 20 of the side members 11 to establish the desired interlocking connection between the end member 12 and the side members 11. The side flanges 30 on the end members 12 are disposed in sliding contact with the outer surfaces of the side members 11 to preclude lateral displacement of the side members when the pan 10 is in assembled condition.

The mounting of the end members 12 on the associated side members 11 is best accomplished (see Fig. 6) by elevating the marginal edge 25 of the end members 12 and introducing the slots 31 into the slots 21 to a position in which the bases of the two slots are in abutting relationship. The marginal edge 25 of the end member 12 is then moved downwardly so that the ends of the abutting flanges 16 of the side members 11 enter the slot 26 formed in the end member 12. The slot 26 passes over the cooperating dimples 22 formed in the flange 16 of the side members 11 at the time when the base surfaces 29 of the grooves 27 lie in abutting relationship with the lateral edges 23 of the eave and roof portions 14 and 15 to provide a snap latching engagement to releasably retain the end member 12 in position on the side members 11.

After the pan 10 has been assembled in the manner previously described, cake dough may be poured into the pan and the pan placed on an oven rack with the lower marginal edges 25 of the end members 12 forming the support for the pan.

After the baking of the cake is completed, and the cake is allowed to cool, the pan may be inverted and the end members 12 may be removed by engaging the end of the flange portions 16 with the thumb and placing the index and middle fingers against the inner surface of the end members 12 on opposite sides of the slot 27. A slight squeezing pressure will serve to disengage the latching connection between the dimples 22 formed on the flange portions 16 of the side members 11 and the slot 26 formed in the end member 12. The pan 10 is held down with one hand while the marginal edge 25 of the end wall 12 is swung outwardly a sufficient distance for the inner edge of the flanges 30 to clear the edges 23 of the eave portions 14. The end member 12 may be raised to disengage the interlocking connection between the slots 21 and 31 to permit the removal of one end member 12 from the finished cake. The identical operation is followed to remove the other end member 12. The side members 11 may then be swung outwardly to remove them from the finished cake. It should be noted at this time that the removal of the parts of the assembled pan from the cake may be expeditiously effected without danger of damage to the cake.

From the foregoing detailed description of the present invention, it will be noted that a new and improved knockdown pan has been provided which embodies a number of functional and structural advantages. Foremost among the advantages of the present invention lies in the provision of a knock-down pan in which a solid cake which embodies the appearance of a common object in miniature such as a house may be formed. Secondly, the knockdown arrangement of the present pan provides a simple, inexpensive and effective means whereby the pan may be removed from the finished cake without danger of damaging the appearance of the cake. Thirdly, the knockdown feature of the present invention affords several distinct advantages in that it facilitates compact and easy storing of the device when it is not in use, and greatly facilitates the washing and cleaning of the device.

While the detailed description of the present invention has referred to the forming of a cake by the process of baking, it is to be understood that a common object in miniature may be formed of either gelatinous material or from material which may be frozen.

While the invention has been described in considerable detail in the foregoing specification, it is to be understood that various changes may be made in its embodiment without departing from or sacrificing any of the advantages hereinafter claimed.

I claim:

1. A knock-down pan comprising a pair of substantially identically formed side members and a pair of substantially identically formed end members, each of said side members including an inwardly and downwardly directed portion forming one-half of the bottom of the pan, each of said end members including a lower marginal edge disposed below the inwardly and downwardly directed portion of said side members to form a support for the pan, and cooperating means on said side and end members for releasably retaining said members in assembled relationship.

2. A knock-down pan comprising a pair of substantially identically formed side members and a pair of substantially identically formed end members, each of said side members including an inwardly and downwardly directed portion forming one-half of the bottom of the pan, each of said end members including a lower marginal edge disposed below the inwardly and downwardly directed portion of said side members to form a support for the pan, cooperating interlocking means disposed at the adjacent upper corners of said side and end members for releasably retaining the upper portions of said members in assembled relationship, and cooperating latching means disposed adjacent the lower ends of said side members and the bottom of said end members for releasably retaining the bottom portion of said members in assembled relationship.

3. A knock-down pan comprising a pair of substantially identically formed side members and a pair of substantially identically formed end members, each of said side members including an inwardly and downwardly directed portion forming one-half of the bottom of the pan, a flange formed along the lower marginal edge of said inwardly and downwardly directed portion of each of said side members, cooperating positioning means on said flanges to preclude relative movement between said side members when said flanges are placed in face-to-face relationship, each of said end members including a lower marginal edge disposed below the inwardly and downwardly directed portion of said side members to form a support for the pan, and cooperating means on said side and end members for releasably retaining said members in assembled relationship.

4. A knock-down pan comprising a pair of substantially identically formed side members and a pair of substantially identically formed end members, each of said side members including an inwardly and downwardly directed portion forming one-half of the bottom of the pan, a depending flange formed along the lower marginal edge of the inwardly and downwardly directed portion of each of said side members, cooperating positioning means on said depending flanges to preclude relative movement between said side members when said flanges are placed in face-to-face relationship, each of said end members including a lower marginal edge disposed below the inwardly and downwardly directed portion of said side members to form a support for the pan, a slot interrupting the lower marginal edge of said end members, said slot being receivable over the ends of the associated flanges on said side members, said slot being engageable with the cooperating positioning means on said flanges to latch the lower portions of said side and end members in assembled relationship, and cooperating interlocking means adjacent the upper corners of said side and end members for releasably retaining the upper corners of said end and side members in assembled relationship.

5. A knock-down pan in which a solid object simulating the appearance of a miniature house may be formed, said pan comprising a pair of substantially identically formed side members each including indentations simulating the appearance of a door and windows and a pair of substantially identically formed end members each including indentations simulating the appearance of windows, each of said pair of side members including an inwardly and downwardly directed portion forming one-half of the bottom of the pan and delineating one-half of the roof of the house when the pan is assembled, each of said end members including a lower marginal edge disposed below the inwardly and downwardly directed portion of said side members to form a support for the assembled pan, and cooperating means on said side and end members for releasably retaining said members in assembled relationship.

6. A knock-down pan in which a solid object simulating the appearance of a miniature house may be formed, said pan comprising a pair of substantially identically formed side members each including indentations simulating the appearance of a door and windows and a pair of substantially identically formed end members each including indentations simulating the appearance of windows, each of said pair of side members including an inwardly and downwardly directed portion forming one-half of the bottom of the pan and delineating one-half of the roof of the house when the pan is assembled, each of said end members including a lower marginal edge disposed below the inwardly and downwardly directed portion of each of said side members to form a support for the assembled pan, cooperating interlocking means disposed adjacent the upper corners of said side and end members for releasably retaining the upper portions of said members in assembled relationship, and cooperating latching means disposed adjacent the lower ends of said side members and the bottom of said end members for releasably retaining the lower portions of said members in assembled relationship.

7. A knock-down pan in which a solid object simulating the appearance of a miniature house may be formed, said pan comprising a pair of substantially identically formed side members each including indentations simulating the appearance of a door and windows and a pair of substantially identically formed end members each including indentations simulating the appearance of windows, each of said pair of side members including an inwardly and downwardly directed portion forming one-half of the bottom of the pan and delineating one-half of the roof of the house when the pan is assembled, a flange formed along the lower marginal edge of the inwardly and downwardly directed portion of each of said side members, cooperating positioning means on said flanges to preclude relative movement between said side members when said flanges are placed in face-to-face relationship, each of said end members including a lower marginal edge disposed below the inwardly and downwardly directed portion of each of said side members to form a support for the assembled pan, and cooperating means on said side and end members for releasably retaining said members in assembled relationship.

8. A knock-down pan in which a solid object simulating the appearance of a miniature house may be formed, said pan comprising a pair of substantially identically formed side members each including indentations simulating the appearance of a door and windows and a pair of substantially identically formed end members each including indentations simulating the appearance of windows, each of said pair of side members including an inwardly and downwardly directed portion forming one-half of the bottom of the pan and delineating one-half of the roof of the house when the pan is assembled, a depending flange formed along the lower marginal edge of the inwardly and downwardly directed portion of each of said side members, cooperating positioning means in the form of reversely disposed dimples formed adjacent the ends of said depending flanges to preclude relative movement between said side members when said flanges are placed in face-to-face relationship, each of said end members including a lower marginal edge disposed below the inwardly and downwardly directed portion of each of said side members to form a support for the pan, a slot in each of said end members, said slot being receivable over the ends of the associated flanges on said side members, said slot being engageable with said cooperating positioning means on said flanges to latch the lower portions of said side and end members in assembled relationship, and cooperating interlocking means adjacent the upper corners of said side and end members for releasably retaining the upper portions of said side and end members in assembled relationship.

References Cited in the file of this patent

UNITED STATES PATENTS 1,248,532 Noyes Dec. 4, 1917